(12) United States Patent
Birk (10) Patent No.: US 12,172,224 B2
(45) Date of Patent: Dec. 24, 2024

(54) THREAD FORMER

(71) Applicant: WALTER AG, Tubingen (DE)

(72) Inventor: Jurgen Birk, Tubingen (DE)

(73) Assignee: Walter AG, Tubingen (DE)

( * ) Notice: Subject to any disclaimer, the term of this patent is extended or adjusted under 35 U.S.C. 154(b) by 611 days.

(21) Appl. No.: 17/601,995

(22) PCT Filed: Mar. 19, 2020

(86) PCT No.: PCT/EP2020/057679
§ 371 (c)(1),
(2) Date: Oct. 7, 2021

(87) PCT Pub. No.: WO2020/207751
PCT Pub. Date: Oct. 15, 2020

(65) Prior Publication Data
US 2022/0143723 A1 May 12, 2022

(30) Foreign Application Priority Data

Apr. 8, 2019 (EP) ..................................... 19167798

(51) Int. Cl.
*B23G 7/02* (2006.01)
(52) U.S. Cl.
CPC ............ *B23G 7/02* (2013.01); *B23G 2240/12* (2013.01)
(58) Field of Classification Search
CPC . B23G 5/005; B23G 7/00; B23G 7/02; B23G 2240/12
See application file for complete search history.

(56) References Cited

U.S. PATENT DOCUMENTS

| 7,399,231 | B2 | 7/2008 | Glimpel | |
|---|---|---|---|---|
| 7,419,339 | B2 * | 9/2008 | Glimpel | B23G 5/188 407/29 |
| 8,109,701 | B2 * | 2/2012 | Shaheen | B23D 77/00 407/116 |

(Continued)

FOREIGN PATENT DOCUMENTS

| CN | 2090747 U | 12/1991 |
|---|---|---|
| JP | H1119825 A | 1/1999 |

(Continued)

OTHER PUBLICATIONS

JP 2009-101460A, Omi et al. May 2009.*

*Primary Examiner* — Edward T Tolan
(74) *Attorney, Agent, or Firm* — Corinne R. Gorski (57) ABSTRACT

The present invention relates to a thread former for manufacturing an internal thread in a metal workpiece. The thread former includes a forming section having a common central axis of rotation, wherein the forming section has a plurality of lubrication grooves extending parallel to the axis of rotation. The forming section includes a plurality of ridge sections extending along a circumference of the forming section, the plurality of ridge sections being arranged for forming the internal thread in the metal workpiece, and wherein, in a circumferential direction, each two of the plurality of ridge sections are separated by one of the plurality of lubrication grooves. At least the one of the lubrication grooves, when projected into a projection plane perpendicular to the axis of rotation, is asymmetrical with respect to any radius intersecting a surface of the lubrication groove.

13 Claims, 6 Drawing Sheets

(56) References Cited

U.S. PATENT DOCUMENTS

2006/0121995 A1    6/2006  Glimpel et al.
2012/0009034 A1*  1/2012  Mack .................... B23B 51/02
                                                               408/229
2018/0133824 A1*  5/2018  Meyer ................... B23G 5/005

FOREIGN PATENT DOCUMENTS

JP        2001138138 A    5/2001
JP        2010089217 A    4/2010

* cited by examiner

THREAD FORMER

RELATED APPLICATION DATA

This application is a § 371 National Stage Application of PCT International Application No. PCT/EP2020/057679 filed Mar. 19, 2020 claiming priority to EP 19167798.8 filed Apr. 8, 2019.

TECHNICAL FIELD

The present disclosure relates to a thread former for manufacturing an internal thread in a metal workpiece, the thread former comprising a shaft having a first end and a second end, a mounting section connected to the first end of the shaft for mounting the thread former to a spindle of a machine tool, and a forming section connected to the second end of the shaft, wherein the shaft, the mounting section and the forming section have a common central axis of rotation, the axis of rotation extending in a longitudinal direction, wherein the forming section comprises a plurality of lubrication grooves extending parallel to the axis of rotation and wherein the forming section comprises a plurality of ridge sections extending along a circumference of the forming section, wherein the plurality of ridge sections are arranged for forming the internal thread in the metal workpiece, and wherein in a circumferential direction, each two of the plurality of ridge sections are separated by one of the plurality of lubrication grooves.

BACKGROUND

There are different types of thread formers, sometimes also denoted as thread forming tools. A thread former creates an internal thread in a metal workpiece without any material-removing action, such as cutting or chip-removing machining. One type of thread former has a forming section that is provided with a plurality of ridge sections, which plurality of ridge sections are arranged at the periphery of the forming section to form the internal thread. Expressed in other words, the plurality of ridge sections in the forming section of the thread former are arranged in the shape of a circumferential spiral. Some thread formers comprise a plurality of lubrication grooves extending parallel to the axis of rotation. In a circumferential direction, each two of the plurality of ridge sections are separated by one of the plurality of lubrication grooves. The process of forming an internal thread in a metal workpiece using such a thread former involves inserting the thread former into an already existing bore while rotating the thread former around its central axis of rotation and moving the tool axially forwards. Normally, the maximum radial extension of the forming sections, measured with respect to the axis of rotation, is larger than the radius of the existing bore. The ridge sections are pressed into the surface of the workpiece, causing re-shaping or deformation of the cylindrical wall of the existing bore so that the internal screw thread is formed.

Due to this re-shaping of the workpiece, thread formers operating without cutting the workpiece are subject to severe stress, a high degree of wear as well as high temperatures. Sometimes thread formers suffer from crack formation at the ridge sections of the forming section.

SUMMARY

It is an object of the present disclosure to provide a thread former having an increased tool life. A further object is to provide a thread former with improved wear resistance.

At least one of the above-mentioned objects is achieved by the invention as defined in the attached claims.

According to an aspect of the present disclosure, at least one of the above-mentioned objects is addressed by a thread former for manufacturing an internal thread in a metal workpiece. The thread former comprises a shaft having a first end and a second end, a mounting section connected to the first end of the shaft for mounting the thread former to a spindle of a machine tool, and a forming section connected to the second end of the shaft. The shaft, the mounting section and the forming section have a common central axis of rotation, the axis of rotation extending in a longitudinal direction. The forming section comprises a plurality of lubrication grooves extending parallel to the axis of rotation. The forming section comprises a plurality of ridge sections extending along a circumference of the forming section, wherein the plurality of ridge sections are arranged for forming the internal thread in the metal workpiece. Furthermore, in a circumferential direction, each two of the plurality of ridge sections are separated by one of the plurality of lubrication grooves. At least the one of the lubrication grooves, when projected into a projection plane perpendicular to the axis of rotation, is asymmetrical with respect to any radius intersecting a surface of the lubrication groove.

It is the basic concept of a thread former according to the present disclosure to provide at least one of the plurality of lubrication grooves with an asymmetry. This asymmetry is visible when the two of the plurality of ridge sections that are separated by the one of the plurality of lubrication grooves are projected into a plane perpendicular to the axis of rotation, i.e. the projection plane. The outer contour of this projection corresponds well to the outer contour of the thread former visible by an observer in an axial view onto the tip with the forming section of the thread former.

According to the present disclosure, the flanks of the ridge sections that are adjacent to the lubrication groove are designed differently, which results in an asymmetric lubrication groove. Thereby the ridge sections have a stronger and/or more stable flank at one of their sides. Thus, thanks to the asymmetry of at least the one of the lubrication grooves, a stronger and/or more stable tool with increased tool life can be achieved.

According to embodiments of the present disclosure, one of the two ridge sections adjacent to the one lubrication groove can be designed to provide enhanced strength, while the other of the two ridge sections adjacent to the one lubrication groove can be designed to provide additional space for cooling and lubrication fluid so that an overdue reduction of the free-cross sectional area of the one lubrication groove is avoided. Thereby, the ridge section is strengthened and efficiently cooled/lubricated at the same time.

Thus, a thread former having a ridge section with increased strength at one of its flanks and lubrication grooves with efficient supply of cooling and/or lubrication fluid is achieved. Thereby, a thread former with increased tool life and wear resistance is provided.

The plurality of ridge sections are arranged for forming the internal thread in the metal workpiece.

In other words, the plurality of ridge sections are arranged along a helically shaped path around the common axis of rotation, wherein each of the plurality of ridge sections have a cross-section approximately corresponding to the cross-sectional form of the grooves in the internal thread to be manufactured.

There are thread formers with helically-shaped lubrication grooves extending at a helix angle with respect to the axis of rotation. However, the present disclosure relates to thread formers having a plurality of lubrication grooves extending parallel to the axis of rotation without inclination with respect to the axis of rotation.

The thread former according to the present disclosure is designed to have a direction of rotation so that inner threads with a desired handedness can be manufactured in the metal workpiece. Consequently, each of the plurality of ridge sections has a leading end point at its periphery, which leading end point is a leading point of the ridge section when the thread former is rotated in the direction of rotation. Furthermore, each of the plurality of ridge sections has a trailing end point at its periphery, which trailing end point is a trailing point of the ridge section when the thread former is rotated in the direction of rotation.

In an embodiment of the present disclosure, the forming section of the thread former, when projected into the projection plane, has a polygonal shape. Specifically, the forming section has an overall polygonal shape along the periphery the ridges as seen in the projection. The corners of the polygon are formed by points of maximum radial extension of the plurality of ridge sections.

In an embodiment, wherein the end points of the two of the plurality of ridge sections adjacent to the one lubrication grooves have different radial distances from the axis of rotation, according to the present disclosure, the lubrication groove is deemed asymmetrical if it is asymmetrical up to a radial distance from the axis of rotation equal to the smaller radial distance of the two end points of the adjacent forming ridges.

In an embodiment of the present disclosure, the asymmetry of the lubrication groove is also visible in a cross-sectional plane, which is perpendicular to the axis of rotation and extends through the two of the plurality of ridge sections and the one of the plurality of lubrication grooves. Due to the helical arrangement of the plurality of ridge sections, the leading flank and trailing flank of the lubrication groove may have end points at different radial distances from the axis of rotation. In such cases and in the sense of the present disclosure, the shape of the one lubrication groove is evaluated only up to a radial distance from the axis of rotation which is equal to the smaller one of the radial distances of those end points.

In an embodiment of the present disclosure, each of the plurality of lubrication grooves, when projected into the projection plane perpendicular to the axis of rotation, is asymmetrical with respect to any radius intersecting the surface of the respective lubrication groove. Thereby, each of the plurality of lubrication grooves provides the advantages of the at least one asymmetrical lubrication groove. Furthermore, in an embodiment of the present disclosure, each of the plurality of lubrication grooves, when projected into the projection plane, has the same shape. Thus, each of the plurality of lubrication grooves can be manufactured with the same tool or tools.

In an embodiment of the present disclosure, at least the one of the lubrication grooves extends in the forming section of the thread former only. In an embodiment of the present disclosure, each of the plurality of lubrication grooves extends in the forming section of the thread former only. In a further embodiment of the present disclosure, at least the one of the lubrication grooves extends in the forming section as well as in the shaft of the thread former. In an embodiment, each of the plurality of lubrication grooves extends in the forming section as well as in the shaft of the thread former. An extension of at least the one lubrication groove in the shaft enables an effective transport of lubrication fluid into the bore during the forming of the internal thread, even after the forming section has been screwed into the bore over its entire axial extension.

In an embodiment of the present disclosure, the any radius is a dividing radius, which dividing radius divides the one of the plurality of lubrication grooves into a first part and a second part, wherein the dividing radius intersects the surface of the one of the plurality of lubrication grooves at a minimum point having a minimum radial distance from the axis of rotation. This feature balances sufficient support of one side of a ridge section, which side is adjacent to the one lubrication groove, and an efficient transport of lubrication fluid in the one lubrication groove.

In an embodiment of the present disclosure, at least the one lubrication groove is asymmetrical along the entire longitudinal extension of the lubrication groove in the forming section and, optionally, in the shaft. Due to the asymmetry along the entire axial extension, a supporting functionality is provided to all ridge sections along the axial extension. Furthermore, in an embodiment, the one lubrication groove is manufactured with a single grinding tool along its entire axial extension in the forming section and, optionally, in the shaft.

In an embodiment of the thread former according to the present disclosure, the surface of the one lubrication groove extends from the trailing end point of a first of the two ridge sections to a leading end point of a second of the two ridge sections. The surface of the one lubrication groove has a minimum point which minimum point has a minimum radial distance from the axis of rotation. Furthermore, the one lubrication groove comprises two part-surfaces, wherein a first part-surface extends from the trailing end point of the first ridge section to the minimum point and a second part-surface extends from the minimum point to the leading end point of the second ridge section.

In view of this, there are two distinguishable designs of the claimed asymmetry of the one lubrication groove. In a first embodiment, the asymmetry of the one lubrication groove provides support for the trailing end of the first ridge section and, in a second embodiment, the asymmetry of the one lubrication groove provides support for the leading end of the second ridge section.

In an embodiment, the any radius is a dividing radius, which dividing radius divides the one lubrication groove into a first part and into a second part, wherein the dividing radius intersects the surface of the one lubrication groove at a minimum point having a minimum radial distance from the axis of rotation. When projected into the projection plane, the first part is limited by the first part-surface, and the second part is limited by the second part-surface. In a first embodiment, the first part of the one lubrication groove has a smaller cross-sectional area than the second part. In this first embodiment the asymmetry of the lubrication groove supports the strength and stability of the trailing end of the first ridge section. In a second embodiment the first part of the one lubrication groove has a larger cross-sectional area than the second part. In this second embodiment the asymmetry of the lubrication groove supports the strength and stability of the leading end of the second ridge section. In the two embodiments, the larger area of the second part of the lubrication groove can be designed to compensate for the smaller area of the first part so that sufficient flow of lubrication fluid can be ensured.

In an embodiment of the present disclosure, the area of the first and second parts of the lubrication groove, when projected into the projection plane, is measured as the area between the first part-surface and the second part-surface, respectively, the dividing plane and a straight line connecting the trailing end of the first ridge section and the leading end of the second ridge section.

In an embodiment of the thread former according to the present disclosure, when projected into the projection plane, the second part-surface has a concave curvature along its entire extension from the minimum point to the leading end point of the second ridge section and the first part-surface is shorter than the second part-surface. In this embodiment, substantially more material is left at the trailing end of the first ridge section, which provides an improved stability to the trailing end of the first ridge section. At the same time, the concave shape of the second part-surface provides a sufficient flow of lubrication fluid through the one lubrication groove.

In an embodiment of the thread former according to the present disclosure, when projected into the projection plane, at least a part of the first part-surface is straight. Straight part-surfaces are easy to machine, e.g. by grinding, and provide considerable stability by avoidance of peak loads.

In an embodiment of the thread former according to the present disclosure, when projected into the projection plane, the first part-surface has a first top angle, which first top angle is formed between a first radius intersecting the trailing end point of the first ridge section and the second radius intersecting a first midpoint on the first part-surface. The second part-surface has a second top angle, which second top angle is formed between a third radius intersecting the leading end point of the second ridge section and a fourth radius intersecting a second midpoint on the second part-surface. The first midpoint and the second midpoint have an equal radial distance from the axis of rotation, which radial distance is equal to half the sum of the maximum radial extension of the first ridge section and the radial distance of the minimum point from the axis of rotation. In this embodiment, the first top angle is larger than the second top angle. Thereby the stability of the trailing flank of the first ridge section is increased as compared to the leading flank of the second ridge section.

In an embodiment of the thread former according to the present disclosure the first top angle is in a range from 2,8°-12,0°. A smaller angle would in some embodiments not contribute sufficiently to the strength of the ridge section. A larger angle than 12° would in some embodiments not add more strength than the angle of 12° already achieves. Preferred angles for sufficiently good strength are in a range of 5° 10°.

These properties of the trailing flank of the first ridge section and the leading flank of the second ridge section can also be expressed by refence to top flank angles. In general, increasing a first top flank angle between the first part-surface of the one lubrication groove (which could also be denoted as the leading flank of the one lubrication groove) increases the stability of the first ridge section. This first top flank angle is formed between the periphery of the first ridge section and the leading flank of the one lubrication groove. A second top flank angle is formed between the periphery of the second ridge section and the second part-surface of the lubrication groove (which could also be denoted as the trailing flank of the one lubrication groove). The first top angle and the second top angle in the sense of the present disclosure provide a measure comparable to the first and second top flank angles and thus do both describe the stabilizing asymmetry according to the present disclosure. The first and second midpoints are points defined on the first and second part-surfaces in order to provide a measure for the first and second top angles, respectively.

In an embodiment of the tread former according to the present disclosure, when projected into the projection plane, the first part-surface has a first bottom angle, which first bottom angle is formed between the dividing radius intersecting the minimum point and the second radius intersecting the first midpoint on the first part-surface, and the second part-surface has a second bottom angle, which second bottom angle is formed between the dividing radius intersecting the minimum point and the fourth radius intersecting a second midpoint on the second part-surface, wherein the first bottom angle is smaller than the second bottom angle.

In general, increasing the first bottom angle increases the strength of the trailing flank of the first ridge section. In some embodiments, increasing the second bottom angle increases the cross-sectional area of the lubrication groove while, due to the smaller first bottom angle, the stability of the ridge is ensured. Thereby a sufficient flow of lubrication fluid through the one lubrication groove can be achieved.

The properties of the trailing flank of the first ridge section and the leading flank of the second ridge section can also be expressed by reference to bottom flank angles. A first such bottom flank angle is formed between the first part-surface of the one lubrication groove and a line, which perpendicularly intersects the dividing radius in the minimum point. A second bottom flank angle is formed between the second part-surface of the one lubrication groove and a line perpendicularly intersecting the dividing radius in the minimum point. According to this definition, decreasing the bottom flank angle achieves an increase in strength and stability of the associated flank. According to some embodiments, a small second bottom flank angle can provide improved coolant flow.

The first bottom angle and the second bottom angle in the sense of the present disclosure provide a measure comparable to the first and second bottom flank angles, and thus, do both describe the stabilizing asymmetry according to the present disclosure.

In an embodiment of the thread former according to the present disclosure, the first bottom angle is in a range from 3.8°-53.0°. A smaller angle would in some embodiments not contribute sufficiently to the stability of the ridge section. A larger angle than 53° would in some embodiments not add more stability than the angle of 53° already achieves. Preferred angles for sufficiently good stability are in a range of 5°-40°.

In an embodiment of the thread former according to the present disclosure, when projected into the projection plane, the trailing end point of the first ridge section, the leading end point of the second ridge section and the minimum point span an isosceles triangle. In this embodiment of the present disclosure, the first and second legs of equal lengths of the isosceles triangle are provided between the minimum point and the trailing end point and between the minimum point and the leading end point, respectively. This shape of the lubrication groove is and provides a tradeoff between stability on the one hand and sufficient flow of lubrication fluid on the other hand.

In an embodiment, the trailing end point of the first ridge section, the leading end point of the second ridge section and the minimum point span a scalene triangle. In this embodiment the stability of one of the two ridge sections is further enhanced. The minimum point of the lubrication groove, when compared to the isosceles triangle, may be shifted either in the direction of rotation in order to stabilize the leading end of the second ridge section or in a direction opposite the direction of rotation in order to stabilize the trailing end of the first ridge section.

BRIEF DESCRIPTION OF THE FIGURES

Further advantages, features and applications of the present disclosure will become apparent from the following description of embodiments and the attached figures. The foregoing presentation of the present disclosure as well as the following detailed description of embodiments of the present disclosure will be better understood when read in conjunction with the attached figures. It should be understood that the depicted embodiments are not limited to the precise arrangements and instrumentalities shown. Unless otherwise indicated, like reference numerals in different figures refer to like or corresponding parts.

DETAILED DESCRIPTION

FIGS. 1 to 8 visualize the basic concept of a thread former 1 according to the present disclosure. The thread former 1 is designed for manufacturing an internal thread into an existing bore in a metal workpiece without any chip-cutting or chip-removing operation. The thread is pressed into the material of the metal workpiece. The thread former 1 has a shaft 2 with a first end 3 and a second end 4. A mounting section 5 is connected to the first end 3 of the shaft 2 and a forming section 6 is connected to the second end 4 of the shaft 2. During forming operation, the mounting section 5 is clamped in a spindle of a machine tool, wherein the machine tool provides a rotation of the thread former 1 about a central axis of rotation 7. The axis of rotation 7 is a common central axis of rotation of the shaft 2, the mounting section 5 and the forming section 6. The axis of rotation 7 extends in a longitudinal direction of the thread former 1.

During operation of the thread former 1, only the forming section 6 is brought into engagement with the workpiece. In order to carry out a re-shaping of a cylindrical inner surface of the bore, the forming section 6 comprises a plurality of ridge sections 9, which ridge sections 9 are located at an outer periphery of the forming section 6. The ridge sections 9 are arranged on a helically shaped path along the periphery of the forming section 6 around the axis of rotation 7. Thus, the ridge sections 9 each a cross-section approximately corresponding to the cross-sectional form of the grooves in the internal thread to be manufactured.

The helix, which is defined by the ridge sections 9, has the same handedness as the internal thread to be formed in the workpiece. Consequently, the thread former 1 has a natural direction of rotation 12 in which it can be screwed into the bore in the workpiece. Consequently, each element on the periphery of the forming section 6 has a leading part or section and a trailing part or section.

When considered in the axial direction parallel to the axis of rotation 7, the forming section 6 has a plurality of axially spaced ridge sections 9 that correspond to a number of turns of a screw. The maximum radial extension with respect to the axis of rotation 7 of the ridge sections 9 increases in the axial direction from a front end 13 to a rear end 14 of the forming section 6. Due to this increase, the load on the thread former 1 during the forming operation is spread over a plurality of turns until the final depth of the internal thread is reached.

When manufacturing an internal thread with the thread former 1 of any of FIGS. 1 to 8, the thread former 1, and in particular the forming section 6, is subjected to severe stress and to high temperatures due to the interaction between the material of the forming section 6 and the metal workpiece. During the forming operation the thread former 1, and in particular the ridge sections 9 in the forming section 6, are cooled and/or lubricated by a lubrication fluid. For an effective transport of lubrication fluid into the bore and thus to the positions of the ridge sections 9, a plurality of lubrication grooves 8 is provided. In the embodiments of FIGS. 1 to 8, the thread formers 1 have five lubrication grooves 8 that are equally distributed along the periphery of the forming section 6.

Each of the five lubrication grooves 8 extends not only over the entire axial extension of the forming section 6 but also into the shaft 2. So, even if the forming section 6 is screwed into the bore along its entire axial extension, lubrication fluid can be transferred into the lubrication grooves 8 from the shaft 2.

Figure 1:
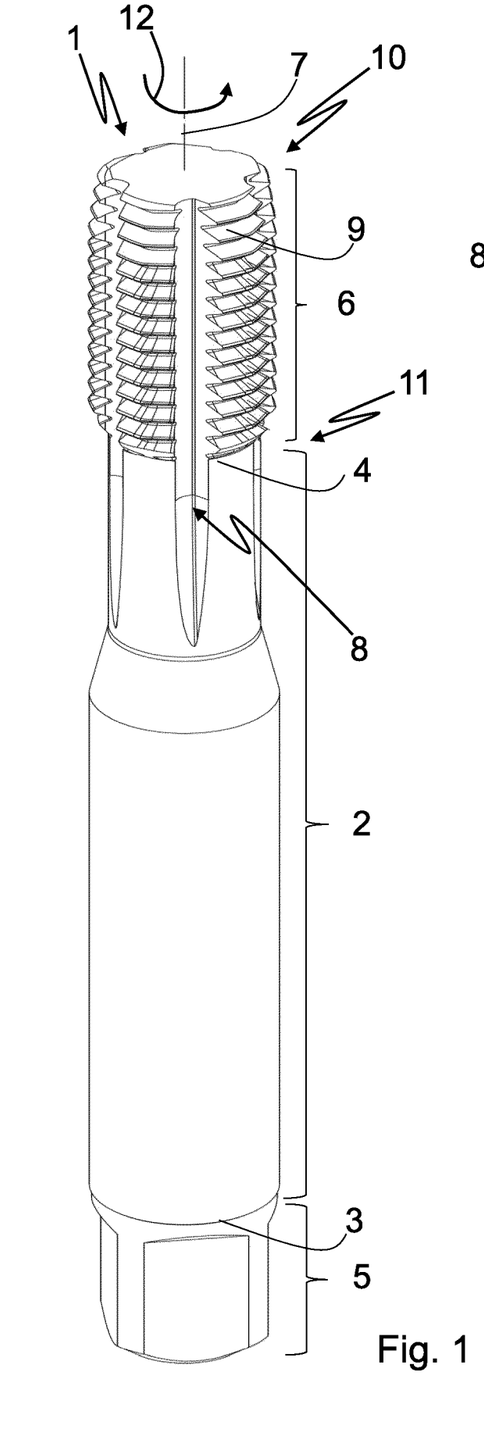
FIG. 1 is an isometric top view of a thread former according to a first embodiment of the present disclosure.
Figure 2:
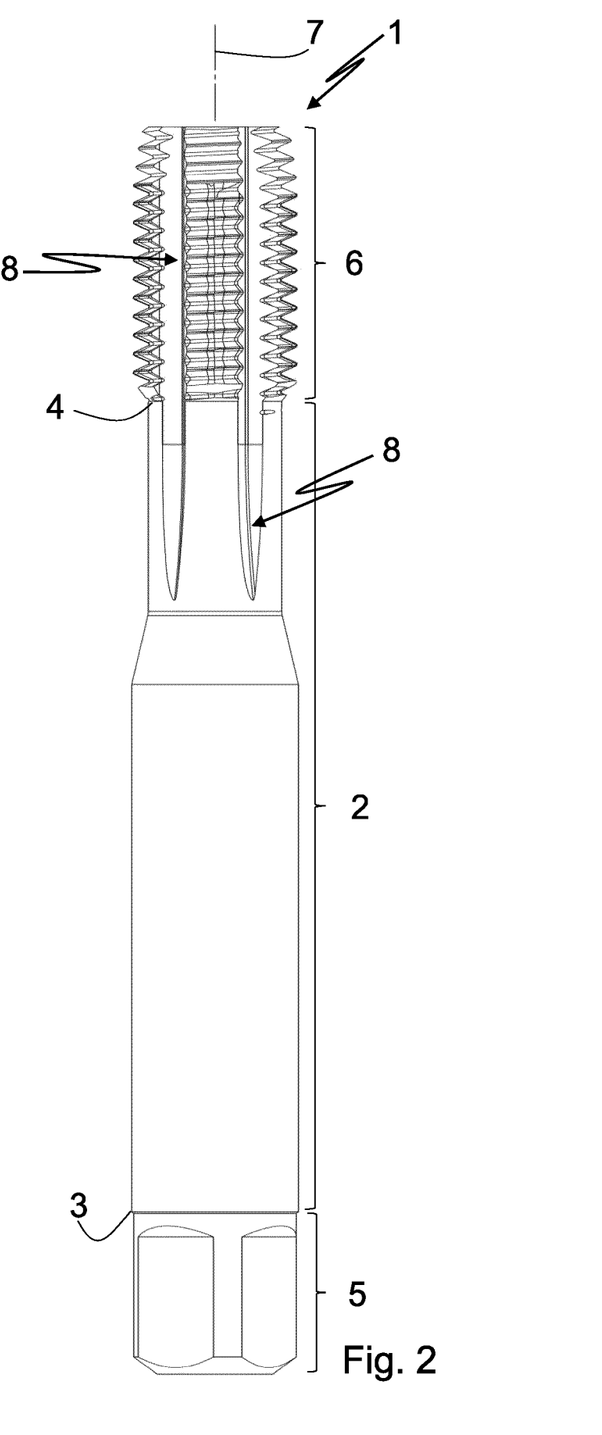
FIG. 2 is a side view of the thread former of FIG. 1.
Figure 3:
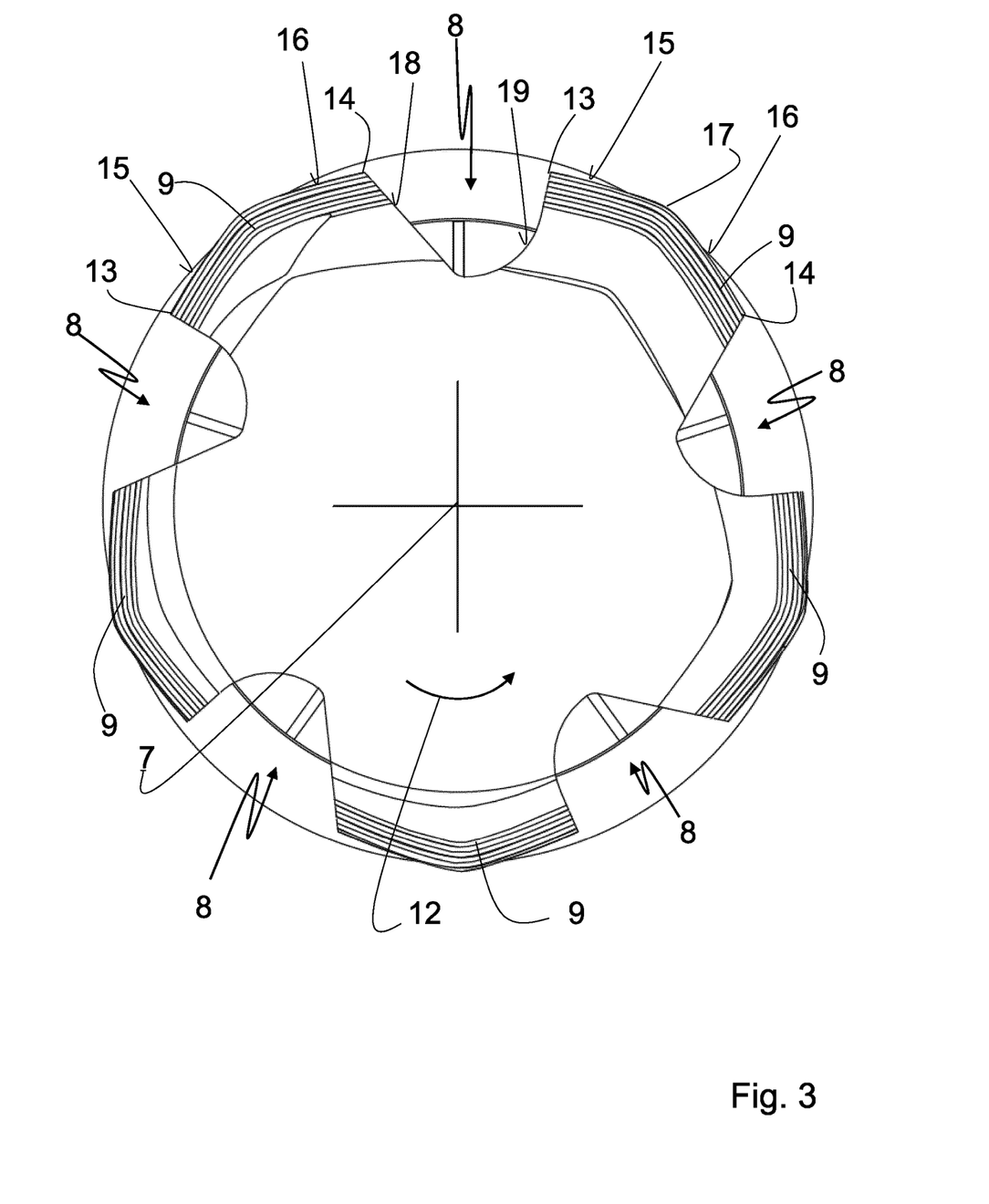
FIG. 3 is a projection of the thread former of FIGS. 1 and 2 onto a projection plane perpendicular to the axis of rotation.
Figure 7:
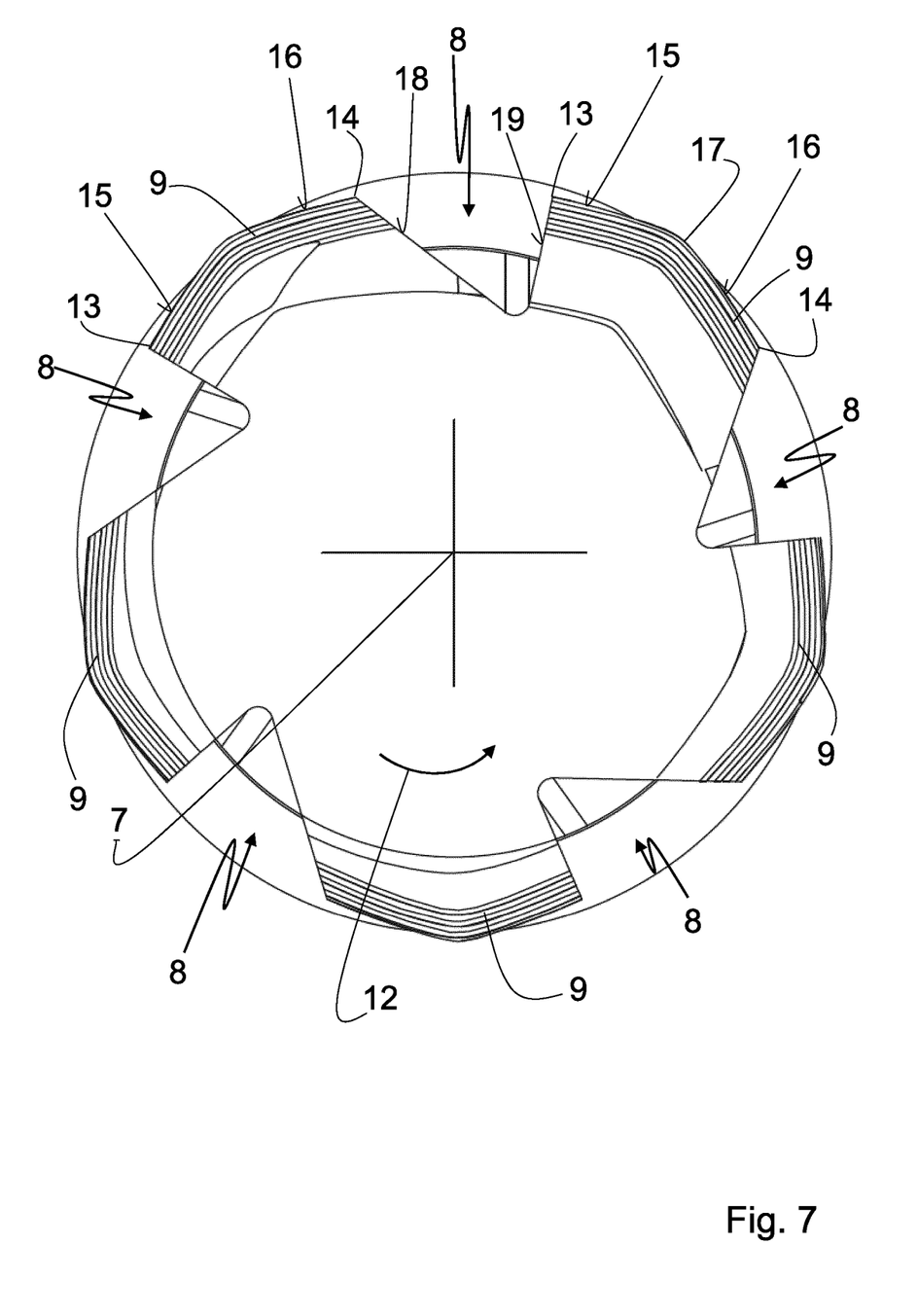
FIG. 7 is a projection of the thread former of FIGS. 5 and 6 onto a projection plane perpendicular to the axis of rotation.

The design and functionality of the individual ridge sections 9 will now be described with reference to FIGS. 3 and 7. FIGS. 3 and 7 both show a projection of an arbitrary turn of the spiral formed by the ridge sections 9 into a projection plane perpendicular to the axis of rotation 7. Each of the ridge sections 9 has a leading end point 13 and a trailing end point 14. The outer periphery of the ridge sections 9 has the shape of a symmetrical roof with an increasing side 15 and decreasing side 16 and a point 17 of maximum radial extension from the axis of rotation 7. The radial distance of the increasing side 15 of the ridge section 9 increases from the leading end point 13 to the point of maximum radial distance 17. The radial distance of the decreasing side 16 of the ridge section 9 decreases from the point 17 of maximum radial extension to the trailing end point 14. The increasing and decreasing sides 15, 16 of the ridge sections 9 have equal length and are symmetrically arranged with respect to the point 17 of maximum radial extension.

Each two of the plurality of ridge sections 9 are separated by one of the plurality of lubrication grooves 8. Consequently, the trailing end point 14 of a first of the two ridge sections 9 forms a leading point of the groove 8 and the leading end point 13 of a second of the two ridge sections 9 forms a trailing point of the lubrication groove 8.

Some prior art thread formers having such symmetrical ridge sections tend to fail due to a breakage of the trailing part of the ridge section. This tendency of damages has been found to be due to stress arising in the forming operation and is addressed by the present disclosure through an asymmetric shape of the lubrication grooves 8 that are located between each two of the plurality of ridge sections 9.

In the two embodiments described with reference to FIGS. 1 to 4 on the one hand, and with reference to FIGS. 5 to 8 on the other hand, the asymmetry is configured such that a first part-surface 18 of the lubrication groove 8 provides more material to the trailing end of the first of the two ridge sections 9. In the first embodiment of FIGS. 1-4, due to the asymmetrical shape of the grooves 8, the increase in material does not reduce the free cross-sectional area of the lubrication groove 8. The shape of second part-surface 19 guarantees that, although the cross-sectional area is restricted at the first part-surface 18 of the lubrication groove 8, enough lubrication fluid can still flow through the lubrication groove 8. The first part-surface 18 could also be denoted as the leading flank of the lubrication groove 8. The second part-surface 18 could also be denoted as the trailing flank of the lubrication groove 8.

However, there may be other embodiments, wherein the design of the ridge sections may be different from the design depicted with reference to FIGS. 1 to 8. In an embodiment, the second part-surface 19 of the lubrication groove 8 could provide an enhanced support of the leading end of the second of the two ridge sections 9 by leaving more material at the leading end of the second ridge section 9. Expressed in other words, in such an embodiment having the same direction of rotation 12, the shape of each of the lubrication grooves 8 would be reversed. This can be advantageous in designs wherein the point of maximum radial extension of the ridge section is shifted toward the leading end point 13.

The exact shape and design of the lubrication grooves 8 will now be described in further detail with reference to the enlarged, broken away projection of FIG. 4.

Figure 4:
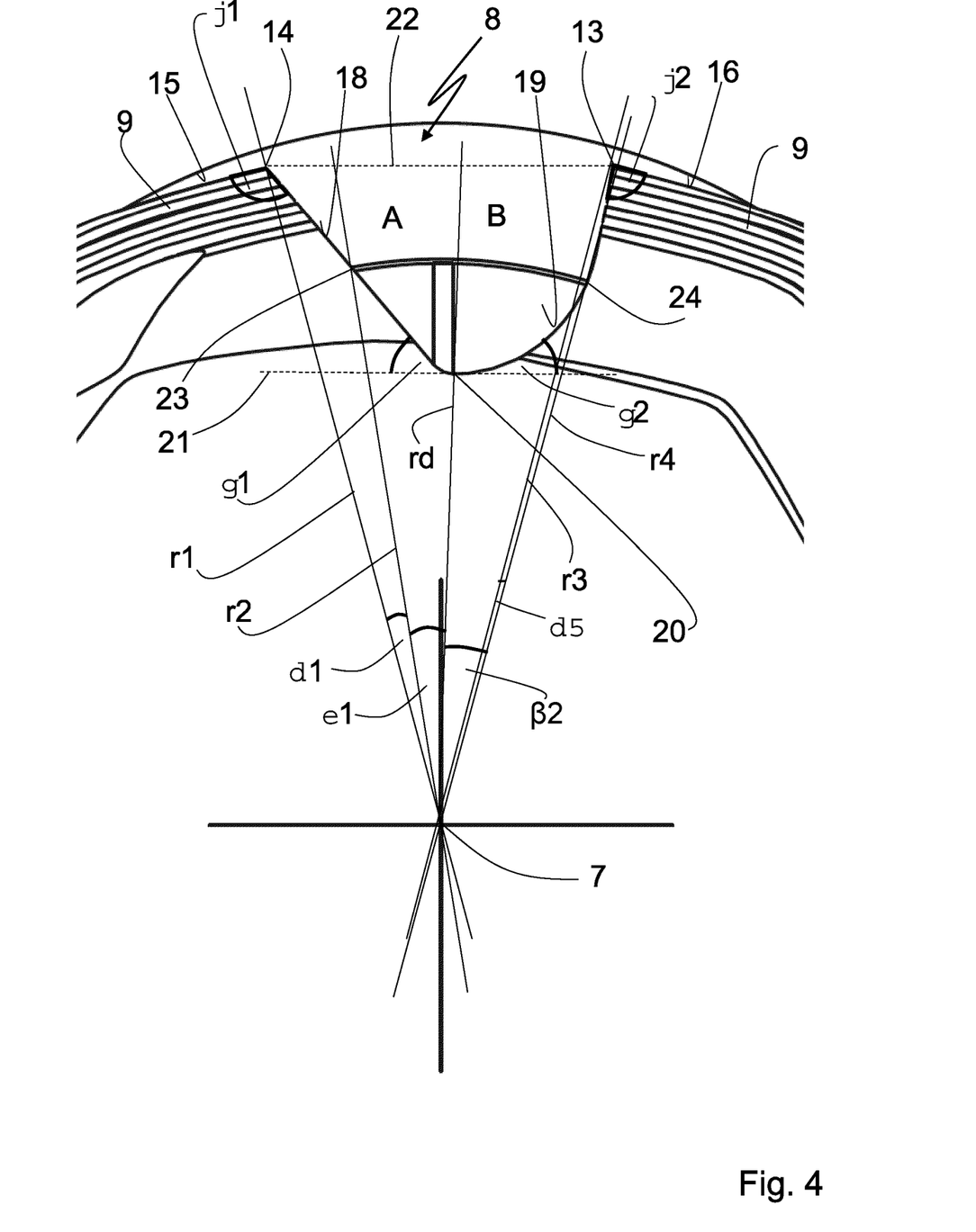
FIG. 4 is an enlarged cutout of the projection of FIG. 3.
Figure 5:
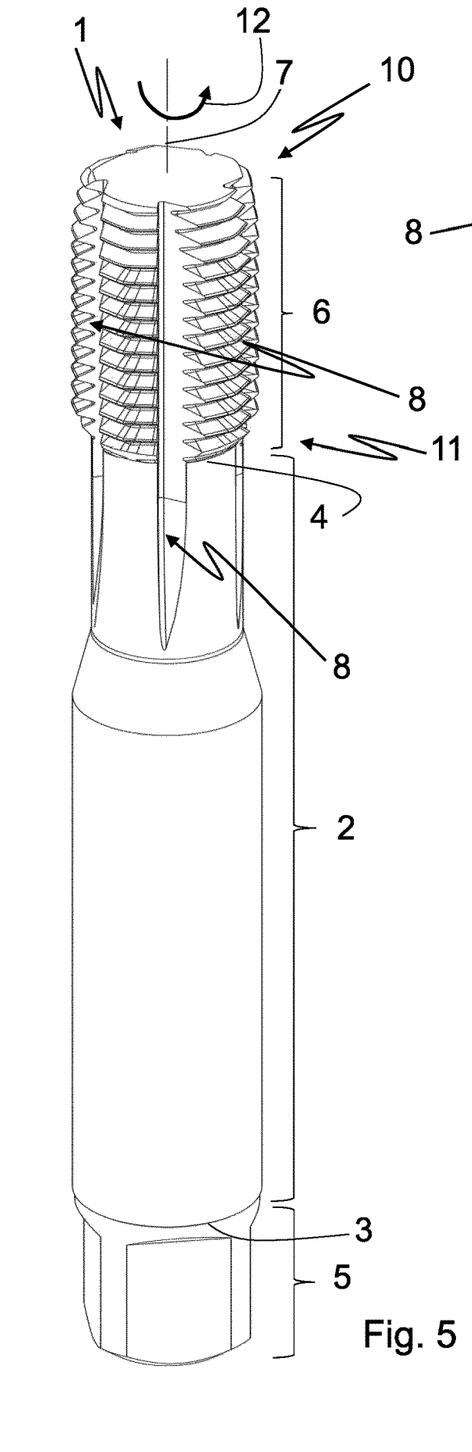
FIG. 5 is an isometric top view of a thread former according to a second embodiment of the present disclosure.
Figure 6:
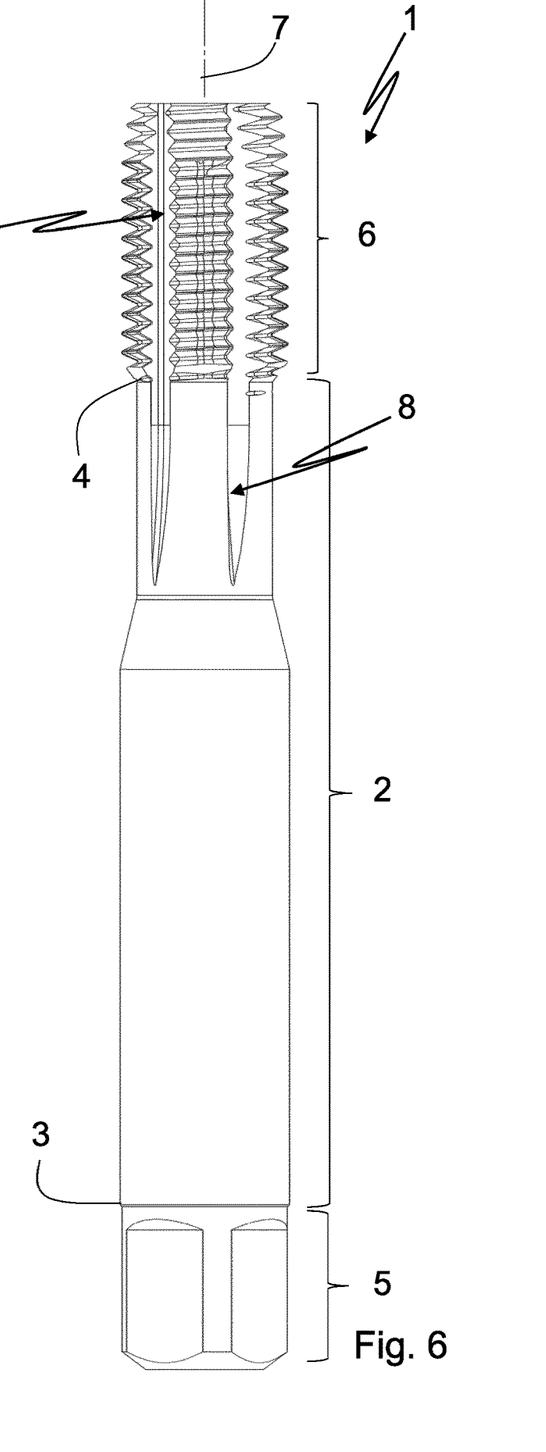
FIG. 6 is a side view of the thread former of FIG. 5.

FIG. 4 is an enlarged cutout of FIG. 3. In the shown embodiment, the trailing end point 14 of the first ridge section 9, the leading end point 13 of the second ridge section 9 and a minimum point 20 on the surface of the lubrication groove 8, which minimum point 20 has a minimum radial distance from the axis of rotation 7, together span an isosceles triangle.

The lubrication groove 8 is asymmetric with respect to a radius rd intersecting the surface 18, 19 of the lubrication groove 8 at the minimum point 20. However, the lubrication groove 8 is also asymmetric with respect to any other radius intersecting the surface 18, 19 of the lubrication groove 8 at any point thereof. The radius rd is a dividing radius in the sense of the present disclosure and divides the lubrication groove 8 into two parts A and B. In FIG. 4, the first part A is left of the dividing radius rd and comprises the first part-surface 18, which extends from the trailing end point 14 of the first ridge section 9 to the minimum point 20. The second part B is right of the dividing radius rd and comprises the second part-surface 19, which extends from the minimum point 20 to the leading end point 13 of the second ridge section 9.

In the embodiment of FIGS. 1 to 4, the second part-surface 19 is concavely curved along its entire extension from the minimum point 20 to the leading end point 13. The first part-surface 18 is shorter than the second part-surface 19. Expressed differently, when seen in the projection view of FIG. 4, the first part-surface 18 has a sorter length than the part surface 19. Thereby more material is left at the trailing end of the first ridge section 9 than at the leading end of the second ridge section 9. In some prior art formers both surfaces of the lubrication groove have concave shape. In contrast, the first part-surface 18 is along a major part approximately a straight line.

In both embodiments shown in FIGS. 1 to 8, an upper flank angle γ1 is formed between the first part-surface 18 and the trailing side 15 of the ridge section 9 and a second top flank angle γ1 is formed between the second part-surface 19 and the leading side 16 of the second ridge section 9. In order to strengthen the trailing end of the first ridge section 9, the first upper flank angle γ1 is larger than the second flank angle γ2.

The asymmetric lubrication groove 8 can be expressed in different terms: Tthe first part-surface 18 comprises a first top angle α1. The first top angle α1 is formed between a first radius r1 intersecting the trailing end point 14 of the first ridge section 9 and a second radius r2 intersecting a first midpoint 23 on the first part-surface 18. The second part-surface 19 has a second top angle α2. The second top angle α2 is formed between a third radius r3 intersecting the leading end point 13 of the second ridge section 9 and a fourth radius r4 intersecting a second midpoint 24 on the second part-surface 19. The first midpoint 23 and the second midpoint 24 have an equal radial distance from the axis of rotation 7, which radial distance equals half the sum of the maximum radial extension of the first ridge section, i.e. the radial distance of point 17 from the axis of rotation 7, and the radial distance of the minimum point 20 from the axis of rotation 7. As the first top flank angle γ1 is larger than the second top flank angle γ2 also the first top angle α1 is larger than the second top angle α2.

In addition to the strengthening of the radially outer part of the of the trailing end of the first ridge section 9 a strengthening effect is also provided at the radially inner part of the trailing end of the first ridge section 9. In the embodiments of FIGS. 1 to 8 this additional strengthening is provided by a small first bottom flank angle δ1. The first bottom flank angle δ1 is formed between a straight line 21 perpendicular to the dividing radius rd and intersecting the minimum point 20 and the first part-surface 18.

A second bottom flank angle δ2 is formed between the straight line 21 perpendicular to the dividing radius rd and intersecting the minimum point 20 and the second part-surface 19. In general, decreasing also the bottom flank angles δ2 achieves an increase in strength and stability of the associated flank. In the first embodiment, the small second bottom flank angle δ2 increases the cross-sectional area of the lubrication groove, which improves the coolant flow.

The relation between the first part-surface 18 and the second part-surface 19 can alternatively be described in terms of a first bottom angle β1 and a second bottom angle β2. The first bottom angle β1 is formed between the dividing radius rd intersecting the minimum point 20 and the second radius r2 intersecting the first midpoint 23 on the first part-surface 18. The second bottom angle β2 is formed between the dividing radius rd and the third radius r3 intersecting the second midpoint 24 on the first part-surface 19. The first bottom angle β1 is smaller than the second bottom angle β2. According to this definition, increasing the first bottom angle β1 increases the strength of the trailing flank of the first ridge section. In the first embodiment according to FIG. 4, increasing the second bottom angle β2 increases the cross-sectional area of the lubrication groove while, due to the smaller first bottom angle β1, the stability of the ridge is ensured. Thereby a sufficient flow of lubrication fluid through the one lubrication groove can be achieved.

Each of the lubrication grooves 8 of the thread former 1, when projected into the projection plane, has the same shape as discussed with reference to FIG. 4.

Figure 8:
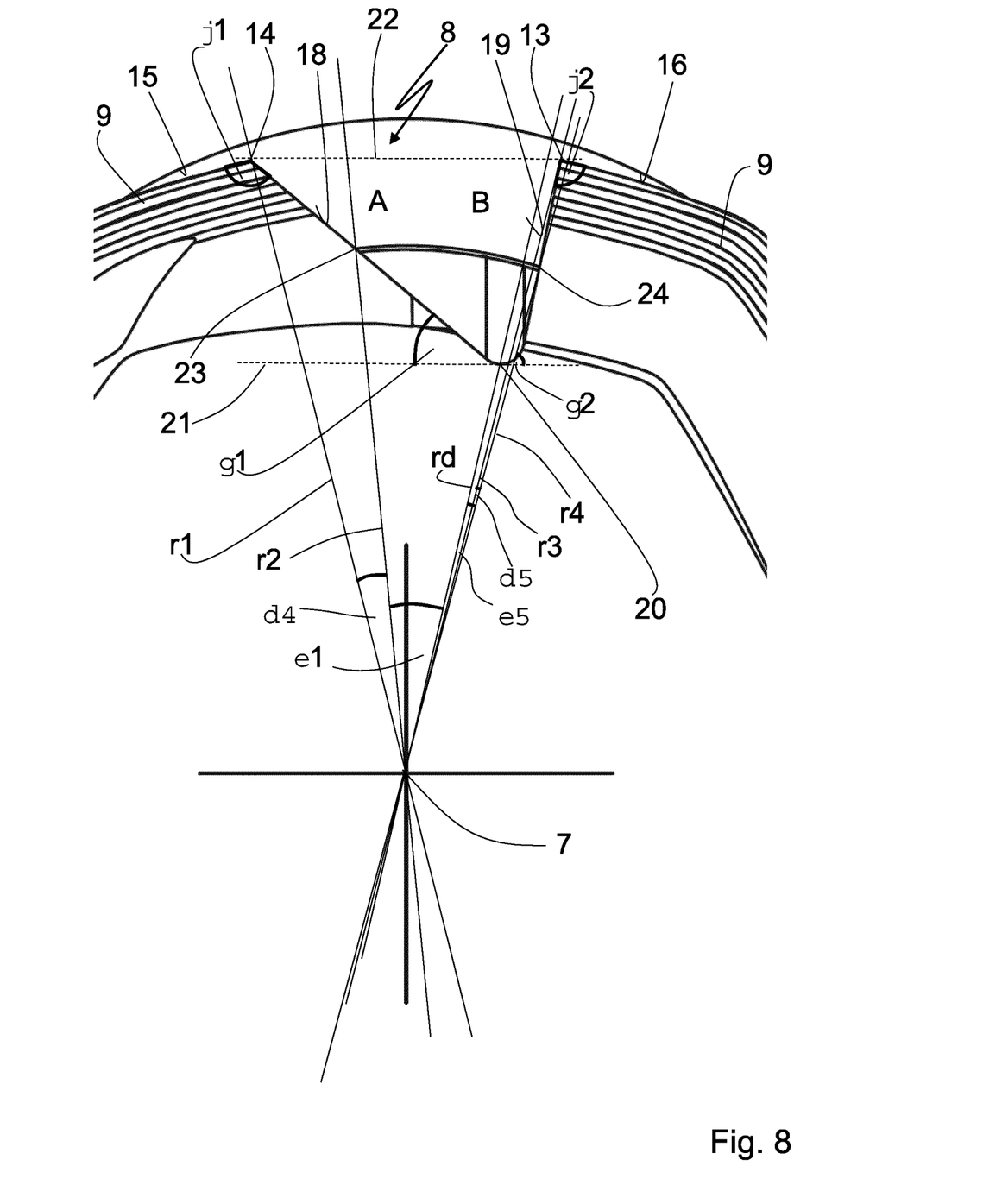
FIG. 8 is an enlarged cutout of the projection of FIG. 7.

The design of the lubrication grooves 8 of the second embodiment according to FIGS. 5 to 8 will now be discussed with reference to the enlarged cutout shown in FIG. 8.

When compared to the embodiment of FIGS. 1 to 4, the embodiment of FIGS. 5 to 8 does not comprise lubrication grooves 8 which include an isosceles triangle. The triangle spanned by the trailing end point 14 of the first ridge section 9, the leading end point 13 of the second ridge section 9 and the minimum point 20 is a scalene triangle. As compared to the first embodiment, the minimum point 20 has been shifted in a direction opposite to the direction of rotation 12, i.e.

towards the tailing side of the lubrication groove 8. Thereby, the trailing part of the first ridge section 9 is even more strengthened.

Again, the first top flank angle γ1 is larger than the second top flank angle γ2. Consequently, also the relations between the first top angle α1 and the second top angle α2 are the same as explained with reference to the embodiment of FIGS. 1 to 4. Thus, the first top angle α1 is larger than the second top α2. In the embodiment of FIGS. 5 to 8, the first part-surface 18 as well as the second part-surface 19 have sections which can be approximated as straight lines.

It is noted that features described in connection with one embodiment also can be used in other embodiments as is readily understandable by a person skilled in the art.

While the disclosure has been described in detail and with reference to the Figures, this description is only an example and is not considered to restrict the scope of protection as it is defined by the claims.

In the claims the word "comprising" does not exclude other elements or steps in the undefined article "a" does not exclude a plurality. The mere fact that some features have been claimed in different claims does not exclude their combination. Reference numbers in the claims are not considered to restrict the scope of protection.

LIST OF REFERENCE NUMBERS

1 thread former
2 shaft
3 first end
4 second end
5 mounting section
6 forming section
7 axis of rotation
8 lubrication grooves
9 ridge section
10 front end of the forming section
11 rear end of the forming section
12 direction of rotation
13 leading end point
14 trailing end point
15 increasing side
16 decreasing side
17 point of maximum radial extension
18 first part-surface
19 second part-surface
20 minimum point
21 straight line perpendicular intersecting the minimum point 20
22 straight line connecting the trailing end point and the leading end point
23 first midpoint
24 second midpoint
A first part of the lubrication groove 8
B second part of the lubrication groove 8
rd dividing radius
r1 first radius
r2 second radius
r3 third radius
r4 fourth radius

The invention claimed is:

1. A thread former for manufacturing an internal thread in a metal workpiece, the thread former comprising:
a shaft having a first end and a second end;
a mounting section connected to the first end of the shaft for mounting the thread former to a spindle of a machine tool; and
a forming section connected to the second end of the shaft, wherein the shaft, the mounting section and the forming section have a common central axis of rotation, the axis of rotation extending in a longitudinal direction, wherein the forming section includes a plurality of lubrication grooves extending parallel to the axis of rotation, wherein the forming section also includes a plurality of ridge sections extending along a circumference of the forming section, wherein the plurality of ridge sections are arranged for forming the internal thread in the metal workpiece, and wherein, in a circumferential direction, each two of the plurality of ridge sections are separated by one of the plurality of lubrication grooves, at least the one of the plurality of lubrication grooves, when projected into a projection plane perpendicular to the axis of rotation, is asymmetrical with respect to any radius intersecting a surface of the lubrication groove, wherein, when projected into the projection plane, the first part-surface has a first top angle, which first top angle is formed between a first radius intersecting the trailing end point of the first ridge section and a second radius intersecting a first midpoint on the first part-surface, the second part-surface has a second top angle, which second top angle is formed between a third radius intersecting the leading end point of the second ridge section and a fourth radius intersecting a second midpoint on the second part-surface, the first midpoint and the second midpoint each having a radial distance from the axis of rotation equal to half the sum of the maximum radial extension of the first ridge section and the radial distance of the minimum point from the axis of rotation, and wherein the first top angle is larger than the second top angle, and wherein, when projected into the projection plane, the first part-surface has a first top angle, which first top angle is formed between a first radius intersecting the trailing end point of the first ridge section and a second radius intersecting a first midpoint on the first part-surface, the second part-surface has a second top angle, which second top angle is formed between a third radius intersecting the leading end point of the second ridge section and a fourth radius intersecting a second midpoint on the second part-surface, the first midpoint and the second midpoint each having a radial distance from the axis of rotation equal to half the sum of the maximum radial extension of the first ridge section and the radial distance of the minimum point from the axis of rotation, and wherein the first top angle is larger than the second top angle.

2. The thread former according to claim 1, wherein the any radius is a dividing radius, the dividing radius dividing the one lubrication groove into a first part and a second part, wherein the dividing radius intersects the surface of the one lubrication groove at a minimum point having a minimum radial distance from the axis of rotation.

3. The thread former according to claim 1, wherein at least the one lubrication groove is asymmetrical with respect to any radius, which radius intersects the surface of the lubrication groove along the entire axial extension of the one lubrication groove in the forming section.

4. The thread former according to claim 2, wherein, when projected into the projection plane, the first part of the one lubrication groove is limited by the first part-surface, and the second part of the one lubrication groove is limited by the second part-surface, wherein the first part has a smaller cross-sectional area than the second part.

5. The thread former according to claim 2, wherein, when projected into the projection plane, the second part-surface has a concave curvature along its entire extension from the minimum point to the leading end point of the second ridge section and the first part-surface is shorter than the second part-surface.

6. The thread former according to claim 1, wherein, when projected into the projection plane, at least a part of the first part-surface is straight.

7. The thread former according to claim 1, wherein the first top angle is in a range from 2.8 to 12 degrees.

8. The thread former according to claim 2, wherein, when projected into the projection plane, the first part-surface has a first bottom angle, which first bottom angle is formed between the dividing radius intersecting the minimum point and the second radius intersecting the first midpoint on the first part-surface, the second part-surface has a second bottom angle, which second bottom angle being formed between the dividing radius intersecting the minimum point and the fourth radius intersecting the second midpoint on the second part-surface, the first midpoint and the second midpoint each having a radial distance from the axis of rotation equal to half the sum of the maximum radial extension of the first ridge section and the radial distance of the minimum point from the axis of rotation, and the first bottom angle being smaller than the second bottom angle.

9. The thread former according to claim 8, wherein the first bottom angle is in a range from 3.8 to 53 degrees.

10. The thread former according to claim 2, wherein, when projected into the projection plane, the trailing end point of the first ridge section, the leading end point of the second ridge section and the minimum point span an isosceles triangle.

11. The thread former according to claim 1, wherein, when projected into the projection plane, the trailing end point of the first ridge section, the leading end point of the second ridge section and the minimum point span a scalene triangle.

12. The thread former according to claim 1, wherein at least the one of the lubrication grooves extends in the forming section and in the shaft.

13. The thread former according to claim 1, wherein all the plurality lubrication grooves, when projected into the projection plane, have the same shape.

* * * * *